Oct. 13, 1925.
H. CLEMENT ET AL
RETINOSCOPE
Filed Feb. 15, 1922
1,556,914
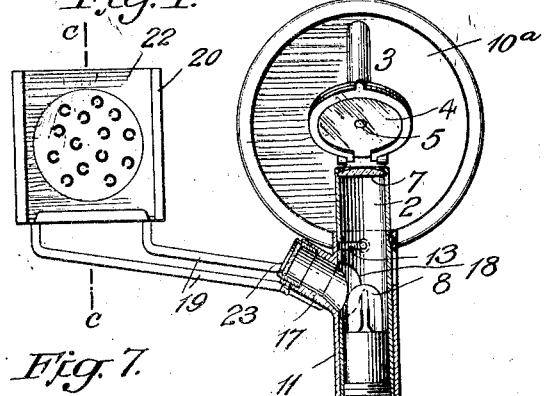
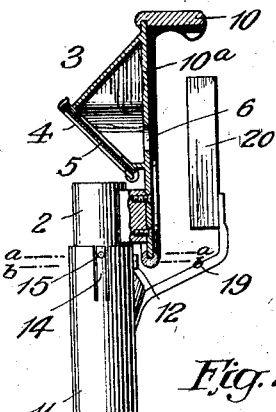
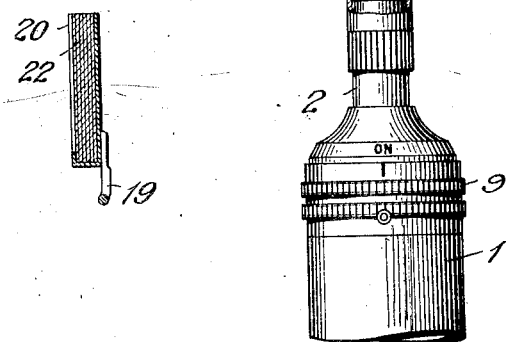
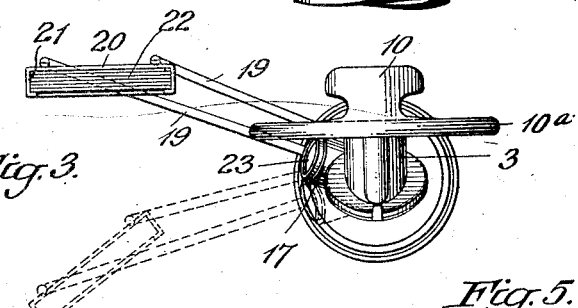
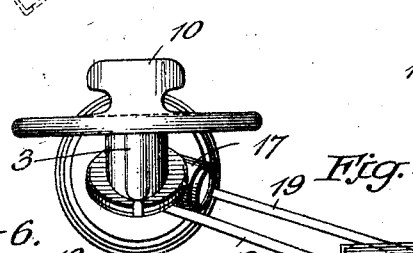

Patented Oct. 13, 1925.

1,556,914

UNITED STATES PATENT OFFICE.

HANS CLEMENT, OF NEW YORK, AND ELMER LE ROY RYER, OF HAWTHORNE, NEW YORK, ASSIGNORS TO GENERAL OPTICAL COMPANY, INC., A CORPORATION OF NEW YORK.

RETINOSCOPE.

Application filed February 15, 1922. Serial No. 536,784.

*To all whom it may concern:*

Be it known that we, HANS CLEMENT and ELMER LE ROY RYER, citizens of the United States, residing at New York, county of New York, and State of New York, and Hawthorne, county of Westchester, and State of New York, respectively, have invented certain new and useful Improvements in Retinoscopes, of which the following is a full, clear, and exact description.

This invention relates to diagnostic instruments such as retinoscopes, skiascopes, opthalmoscopes, and similar instruments which embody an apertured observation mirror for reflecting light into a patient's eye, the effect of which within the eye is observed through the aperture of the mirror.

In determining the refractive action of an eye, it is desirable that fixation charts or targets carrying suitable forms, designs or characters be provided in the same plane as the nodal point of the examiner's eye, upon which the patient may fix his gaze while deciphering or counting designs, dots or suitable characters, his attention be held for an interval sufficient to provide ample time for the desired examination of the retina or the performance of the shadow test. These tests or examinations are facilitated if the distance between the patient's eye and the fixation chart can be varied slightly to cause a slight variation in the accommodation or focal condition of the eye. For this purpose it has been proposed that two charts or targets be provided, one on each side of the mirror, one being slightly forwardly of the reflecting mirror and one slightly to the rear thereof. With this arrangement, it is intended that the patient should change his gaze from one target to the other whenever the examiner wished to observe the effect upon the eye during the change. This arrangement has been found unsatisfactory because during the change, the full glare of the reflected light will strike the eye and temporarily prevent proper focusing thereof upon the other chart or target, with the result that the examiner is unable to observe the action of the eye during slight changes in the focus. These tests are usually carried on in a relatively dark room, and hence suitable provision must be made for the illumination of the charts, without adding materially to the illumination of the room.

An object of the invention is to provide an improved diagnostic instrument of this type, in which the targets are interchangeable, at will; in which the targets are illuminated without materially adding to the illumination of the room; in which the targets are adjustable independently of the mirror to a limited extent toward and from the eye of the patient without interruption of the examination, and which is exceptionally simple, compact, convenient, durable and inexpensive. A further object is to provide a retinoscope or skiascope which may be used by an examiner without injury to eyeglasses which he may be wearing, and which may be easily held in a steady condition during the examination. Other objects and advantages will be apparent from the following description and the novel features of the invention will be particularly pointed out in claims.

In the practical application of the invention, we utilize a common source of illumination for both the chart and mirror, which source is preferably embodied within the instrument itself. The chart is mounted upon the instrument for a limited movement toward and from the eye of a patient and is preferably also movable to the opposite side of the mirror to act as a shield for the other or inactive eye. We contemplate providing the chart with interchangeable sheets carrying various designs or characters thereon and which may be used with children or illiterates, so that the examiner may select a chart for display which he considers most suitable for use with the particular patient under examination. We also contemplate the provision of a guard or a head rest upon the instrument which by its engagement with the forehead serves to steady the instrument when the latter is held in the hand and protects the eyeglasses of the examiner from blows, breakage and scratching. The invention also comprises other details and arrangements which will be explained in the following description of an embodiment of the invention, taken in connection with the accompanying drawing in which:

Fig. 1 is a front elevation partly in section of one embodiment of my improved instrument;

Fig. 2 is a side elevation of the same;

Fig. 3 is a plan of the same;

Fig. 4 is also a plan but with the parts in a different operative position;

Fig. 5 is a section through the stem taken substantially along the line a—a of Fig. 2;

Fig. 6 is a section through the stem taken substantially along the line b—b of Fig. 2; and Fig. 7 is a section through the chart holder taken substantially along the line c—c of Fig. 1.

In the illustrated embodiment the instrument is in the nature of an improvement on the diagnostic instrument disclosed in the U. S. patent to Clement #1,281,136. A suitable handle or support 1 is provided with a hollow stem 2, which carries upon its upper end a retinoscope 3 of any suitable construction. In this particular type of retinoscope an observation mirror 4 is disposed obliquely across the axis of the stem and is provided with an aperture 5 through which observation of the patient's eye may be had by the examiner or physician in a manner well known in this art. The frame of the retinoscope is provided with an aperture 6, aligned with the aperture 5 to permit of observation through the aperture of the mirror from the rear face of the retinoscope. The stem is hollow and at its upper end is provided with a collective lens 7 and at an intermediate point therein is provided with a small electric lamp 8. The electric lamp is connected in a suitable manner with a battery contained within the support or handle 1, the connections between the lamp and battery being controlled by a switch 9 in any suitable manner. The light rays from the lamp 8 pass through the lens 7 obliquely against the mirror 4 and are reflected thereby into the patient's eye and returned to the instrument, passing through the apertures 5 and 6 to the examiner's eye. The upper end of the retinoscope is provided with a guard or head rest 10, which is adapted to rest against the forehead of the examiner so as to assist him in holding the instrument steady and to space the rear plate 10ᵃ of the retinoscope from the eye a distance sufficient to prevent the instrument from scratching or breaking the eye glasses which the examiner may be wearing.

A sleeve 11 is rotatably carried by the stem, being held against movement lengthwise thereof by means of a pin 12 which is carried thereby and engages with a slot 13 in the stem. The slot 13 extends peripherally around the stem for a short distance and limits the rotation of the sleeve upon the stem to slighty more than 180°. The sleeve is also provided with a cut out spring tongue 14, carrying a click pin 15 which is adapted to snap into slight depression 16 in the stem and yieldingly hold the sleeve in various angularly adjusted positions during its rotation upon the stem for a purpose to be later explained.

The sleeve is provided with a branch 17 which extends obliquely and upwardly therefrom at a point approximately opposite the filament of the lamp 8, and the stem is provided with an aperture 18 through which the light rays from the lamp may pass into the branch of the sleeve. A bracket 19 is carried by the branch of the sleeve and at its outer end supports a frame 20, having vertically extending guides 21 therein in which a number of fixation charts 22 may be interchangeably and removably supported. The bracket may conveniently be formed from a piece of wire which has been bent into the desired shape. The frame 20, which may be of pressed metal, is supported obliquely across the axis of the branch sleeve, and the sleeve is provided with a collective lens 23 for focusing the rays of light from the lamp 8 upon the forward fixation chart which is carried in the frame. The charts are supported upon the sleeve so as to be at one side of and face in the same direction as the mirror when the branch of the sleeve is in alignment with the aperture 18 of the stem so as to be illuminated during a small angular extent of rotation of the sleeve and chart. The click pin assists the examiner in rotating the sleeve and the chart holder into selected positions, such as shown in full and dotted lines in Fig. 3 in their short angular path of movement in which illumination of the chart occurs, so that without interrupting observation through the retinoscope, the chart may be adjusted into any of the desired angular positions and yieldingly held in this adjusted position.

The fixation charts or targets may comprise sheets of cardboard upon which are printed various geometrical designs, letters, colors or lines. These charts are slidable into the guides from the top of the frame and are held so that they cannot otherwise move when within the frame. The charts may also be provided with figures or other characters for use with children or illiterates, or the examiner may himself provide charts which are best adapted for use with a particular patient. These charts may be readily interchanged in the guides as occasion demands. The charts are mounted sufficiently far from the reflecting surface of the mirror to prevent contraction of the pupil while the patient is under examination. The eye will therefore be held in a perfectly normal condition but under focal tension.

In the adjustment of the sleeve about the stem, in one position the fixation chart will be disposed in a plane in front of the vertical plane of the instrument, and in another position it will be in a plane to the rear of the vertical plane of the instrument but in the same plane as the nodal point of the operator's eye. If the target is revolved through approximately 180° to the other side of the instrument the fixation chart will be concealed from the line of sight of the patient's eye and permit the patient to see other charts back of the operator so that a study may be made of the patient's eye under these three or other conditions without moving the patient. During the angular adjustment of the fixation charts and sleeve between the positions shown in full and dotted lines in Fig. 3 the chart will be illuminated by the rays from the lamp 8 which pass through the aperture 18 and are projected thereon by the lens 23.

When the chart has been rotated into the position shown in Fig. 4 which is approximately a half revolution from the position shown in Fig. 3, the branch of the sleeve will be carried out of alignment with the aperture 18 and illumination of the chart will be prevented. The chart is preferably disposed at a distance from the aperture of the mirror approximately equal to the distance between a person's eyes so that when shifted into the position shown in Fig. 4 the chart will form a shield for the left eye of the examiner, and it is desirable that when in this position illumination be prevented in order that the light reflected from the chart will not enter the inactive eye of the examiner.

In the use of the instrument, which usually occurs in a darkened room, the switch 9 is operated to light the electric lamp bulb 8, and a chart suitable for the occasion is placed foremost in the guides 21 of the chart holder or frame. The instrument is then brought before the examiner's eye with the head rest 10 placed against the forehead of the examiner so as to steady the instrument during the examination and prevent injury to the eyeglasses of the examiner or the inconvenience of having them struck by the instrument during the examination. The entire instrument is then tilted or adjusted about a vertical axis until the rays of light reflected from the mirror 4 enter the eye of the patient, are reflected from the retina thereof and pass back through the apertures 5 and 6 into the examiner's eye. During this operation the patient is asked to fix his gaze upon the fixation chart which causes him to maintain the eye in a desired and fixed focal condition. By tilting the mirror the movement and character of the skiascopic shadows upon the retina may be observed and the refractive condition of the eye determined. The sleeve may then be rotated between the positions illustrated in Fig. 3 so as to cause a slight change in the focus of the patient's eye while the examiner is observing the effect thereof upon the eye.

By the use throughout the description and claims of the word retinoscope, we intend to include skiascopes, opthalmoscopes and similar instruments which use a mirror in an examination of the eyes.

It will be obvious that various changes in the details and arrangements of parts herein described and illustrated may be made by those skilled in the art within the principle and scope of the invention.

We claim:

1. In a diagnostic instrument, a support, a retinoscope mounted on said support, and a chart holder pivotally mounted on said support for movement about a vertical axis whereby the holder may be moved through a horizontal path into or out of an operative position at one side of the retinoscope.

2. In a diagnostic instrument, a retinoscope, a support upon which the retinoscope is mounted, a chart holder mounted on said support for pivotal movement about a vertical axis passing approximately through the line of sight, and a chart carried by said holder at approximately the level of the line of sight and at a distance from the line of sight approximately equal to the normal pupillary distance of an adult.

3. In a diagnostic instrument, a support having an extending stem, a retinoscope carried upon the free end of the stem, a sleeve rotatably carried by the stem, and a chart supporting frame carried by the sleeve and oscillatable with the sleeve about the stem.

4. In a diagnostic instrument, a support, a retinoscope mirror carried by the support, a chart holder mounted on said support, and a common source of illumination carried by the support in a position to illuminate a chart in the chart holder and project light rays against the retinoscopic mirror.

5. In a diagnostic instrument, a support having an extending tubular stem, a retinoscope carried upon the free end of the stem and having an apertured observation mirror, a sleeve mounted for rotation on said stem, a chart supporting frame carried by the sleeve, a source of illumination in said stem and disposed to project light upon said mirror, said stem and sleeve having cooperating openings through which light from said source is projected upon a chart in said frame during a portion of its movement with the sleeve.

6. In a diagnostic instrument, a support having an extending tubular stem, a retinoscope carried upon the free end of the stem and having an apertured observation mirror, a sleeve mounted for rotation on said stem and having a branch extending upwardly and obliquely therefrom, a source of illumination in said stem at the junction of the branch sleeve with the main section of the sleeve and projecting light through the stem upon the mirror and through the branch sleeve, said stem having an aperture for the passage of light to the branch sleeve, and means carried by the sleeve for supporting the chart for movement with the sleeve and within and oblique to the rays of light from the branch of the sleeve.

7. In a diagnostic instrument, a support having an extending tubular stem, a retinoscope carried upon the free end of the stem and having an apertured observation mirror, a sleeve mounted for rotation on said stem and having a branch extending upwardly and obliquely therefrom, a source of illumination in said stem at the junction of the branch sleeve with the main section of the sleeve and projecting light through the stem upon the mirror and through the branch sleeve, said stem having an aperture for the passage of light to the branch sleeve, and means carried by the sleeve for supporting the chart for movement with the sleeve and within and oblique to the rays of light from the branch of the sleeve, said sleeve and stem having a pin and slot connection for limiting the movement of the sleeve to less than a revolution.

8. In a diagnostic instrument, a support having an extending tubular stem, a retinoscope carried upon the free end of the stem and having an apertured observation mirror, a sleeve mounted for rotation on said stem and having a branch extending upwardly and obliquely therefrom, a source of illumination in said stem at the junction of the branch sleeve with the main section of the sleeve and projecting light through the stem upon the mirror and through the branch sleeve, said stem having an aperture for the passage of light to the branch sleeve, means carried by the sleeve for supporting the chart for movement with the sleeve and within and oblique to the rays of light from the branch of the sleeve, said stem having peripherally spaced recesses, and a spring pressed pin carried by the sleeve for engaging successively in said recesses during the rotary movement of the sleeve to yieldingly hold the sleeve in selected angular positions.

9. In a diagnostic instrument, a support having an extending tubular stem, a retinoscope carried upon the free end of the stem and having an apertured observation mirror, a sleeve mounted for rotation on said stem and having a branch extending upwardly and obliquely therefrom, a source of illumination in said stem at the junction of the branch sleeve with the main section of the sleeve and projecting light through the stem upon the mirror and through the branch sleeve, said stem having an aperture for the passage of light to the branch sleeve, a chart, means carried by the sleeve for supporting the chart for movement with the sleeve and within and oblique to the rays of light from the branch of the sleeve, said sleeve and stem having a pin and slot connection for limiting the movement of the sleeve to less than a revolution, said stem having peripherally spaced recesses, and a spring pressed pin carried by the sleeve for engaging successively in said recesses during the rotary movement of the sleeve to yieldingly hold the sleeve in selected angular positions.

10. In a diagnostic instrument, a support having an extending stem, a retinoscope carried upon the free end of the stem, a sleeve rotatably carried by the stem, a chart, means for supporting the chart from said sleeve for rotation with the sleeve, said stem having peripherally spaced recesses, and a spring pressed pin carried by the sleeve and engaging successively in said recesses during the rotation of the sleeve to yieldingly hold the sleeve in selected angular positions.

11. In a diagnostic instrument, a support having an extending stem, a retinoscope carried upon the free end of the stem, a sleeve rotatably carried by the stem, a chart, means for supporting the chart from said sleeve for rotation with the sleeve, said sleeve and stem having a pin and slot connection to limit rotation of the sleeve.

12. In a diagnostic instrument, a support having an extending tubular stem, a retinoscope carried upon the free end of the stem and having an apertured mirror, a sleeve rotatably carried by the stem and having a transversely extending branch, said stem having an aperture at the junction of the branch with the main section of the sleeve, means for projecting a light through the stem upon the mirror and through the branch sleeve, and a chart holder carried by the sleeve for displaying a chart within and oblique to the path of the light passing through the branch sleeve.

13. In a diagnostic instrument, a support having an extending stem, a retinoscope carried by the free end of the stem and having an apertured observation mirror disposed obliquely across the axis of the stem, a sleeve rotatably carried by the stem and having a branch extending upwardly and obliquely thereto, said stem having an aperture in line with the branch of the sleeve when the latter is in a position at one side of the line of vision of the mirror, means in said stem for projecting light through the stem upon the mirror and through the branch of the sleeve, and a chart holder carried by the sleeve and adapted to display a chart within and oblique to the axis of the branch of the sleeve.

14. The instrument as set forth in claim 13 in which the chart holder is mounted at a distance from the mirror approximately equal to the distance between the eyes whereby the chart holder may be rotated through a half revolution into a position to act as a shield for the unused eye of the operator.

15. The instrument as set forth in claim 12 in which the sleeve is provided with a collective lens for focusing the light upon the chart.

16. The instrument as set forth in claim 12 in which the chart is held in the same plane as the nodal point of the operator's eye.

17. In a diagnostic instrument, a portable retinoscope provided with a supporting handle by which it may be supported and operatively manipulated by the examiner and having a brow rest for steadying the retinoscope by resting against the forehead of the examiner when the retinoscope is properly positioned before the examiner's eye and protecting eye glasses of the examiner.

In witness whereof, we hereunto subscribe our signatures.

HANS CLEMENT.
ELMER LE ROY RYER.